United States Patent
Zhang et al.

(10) Patent No.: US 9,197,350 B2
(45) Date of Patent: Nov. 24, 2015

(54) SYSTEMS AND METHODS FOR ROUTING AND WAVELENGTH ASSIGNMENT FOR NETWORK VIRTUALIZATION

(71) Applicant: Fujitsu Limited, Kawasaki-shi, Kanagawa (JP)

(72) Inventors: Qiong Zhang, Plano, TX (US); Weisheng Xie, Dallas, TX (US); Qingya She, Plano, TX (US); Xi Wang, Murphy, TX (US); Paparao Palacharla, Richardson, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 248 days.

(21) Appl. No.: 14/037,016

(22) Filed: Sep. 25, 2013

(65) Prior Publication Data

US 2014/0099118 A1     Apr. 10, 2014

Related U.S. Application Data

(60) Provisional application No. 61/710,955, filed on Oct. 8, 2012.

(51) Int. Cl.
   *H04J 14/02*     (2006.01)
   *H04L 12/713*    (2013.01)
   *H04L 12/721*    (2013.01)

(52) U.S. Cl.
   CPC ......... *H04J 14/0227* (2013.01); *H04J 14/0257* (2013.01); *H04J 14/0267* (2013.01); *H04L 45/586* (2013.01); *H04L 45/62* (2013.01)

(58) Field of Classification Search
   CPC .................................................. H04J 14/0241
   See application file for complete search history.

(56) References Cited

PUBLICATIONS

M. Yu et al., "Rethinking Virtual Network Embedding: Substrate Support for Path Splitting and Migration", ACM SIGCOMM Computer Communication Review, vol. 38, No. 2, Apr. 2008.*
Q. Zhang et al., RWA for Network Virtualization in Optical WDM Networks, National Fiber Optic Engineers Conference, 4 pages, Mar. 17, 2013.
J. Lischka and H. Karl, "A virtual network mapping algorithm based on subgraph isomorphism detection", ACM SIGCOMM VISA, p. 81-88, 2009.
Y. Zhu and M. Ammar, "Algorithms for assigning substrate network resources to virtual network components", Infocom, 12 pages, 2006.
S. Peng et al., "Virtual optical network composition over single-line-rate WDM optical networks", OFC, 3 pages, 2012.
H. Yang et al., "Cross stratum optimization of application and network resource based on global load balancing strategy in dynamic optical networks", OFC 2012, 3 pages, 2012.
X. Liu et al., "Application-specific, agile and private platforms for federated computing services over WDM networks", Infocom, p. 2656-2660, 2009.

* cited by examiner

*Primary Examiner* — Shi K Li
(74) *Attorney, Agent, or Firm* — Baker Botts L.L.P.

(57) ABSTRACT

A method for routing and wavelength assignment for optical network resources required for a plurality of virtual network requests includes receiving the plurality of virtual network requests. The method further includes determining a number of virtual links for each virtual network request. The method includes sorting the plurality of virtual network requests based on the number of virtual links, and selecting a virtual network request from the plurality of virtual network requests and setting a number of allowable spans. Additionally, the method includes determining whether a valid virtual node mapping exists for the virtual network request on any of a plurality of wavelengths based on the allowable spans, and based on determining that no valid virtual node mapping exists on any of the plurality of wavelengths, incrementing the number of allowable spans.

20 Claims, 11 Drawing Sheets

SYSTEMS AND METHODS FOR ROUTING AND WAVELENGTH ASSIGNMENT FOR NETWORK VIRTUALIZATION

PRIORITY CLAIM

This application claims priority under 35 U.S.C. §119 to U.S. Provisional Patent Application Ser. No. 61/710,955 filed Oct. 8, 2012. The content of which is incorporated by reference herein in its entirety.

TECHNICAL FIELD OF THE INVENTION

The present invention relates generally to optical communication networks and, more particularly, to routing and wavelength assignment for network virtualization in optical wavelength division multiplexing networks.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths, thereby increasing network capacity. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information.

As the need for data and information increase, more geographically distributed data centers may be attached to the physical Internet infrastructure to accommodate increasing demand for computational and storage resources. The physical network infrastructure may support many applications that may require widely-dispersed computing resources due to service locality, e.g., geographical service distribution for a better customer experience, high definition video streaming, and data backup services. Network virtualization may provide a scheme for addressing the growth and inflexibility of the physical infrastructure. Virtual network (VN) mapping may allocate physical resources for network virtualization.

SUMMARY

In accordance with one or more embodiments of the present disclosure, a method for routing and wavelength assignment for optical network required for a plurality of virtual network requests includes receiving the plurality of virtual network requests. The method further includes determining a number of virtual links for each virtual network request. The method includes sorting the plurality of virtual network requests based on the number of virtual links, and selecting a virtual network request from the plurality of virtual network requests and setting a number of allowable spans. Additionally, the method includes determining whether a valid virtual node mapping exists for the virtual network request on any of a plurality of wavelengths based on the allowable spans, and based on determining that no valid virtual node mapping exists on any of the plurality of wavelengths, incrementing the number of allowable spans.

In accordance with another embodiment of the present disclosure, an optical network includes a plurality of physical nodes and a plurality of physical links that communicatively couple the plurality of physical nodes. The network includes a resource manager communicatively coupled to the plurality of physical nodes. The resource manager is configured to receive a plurality of virtual network requests and determine a number of virtual links for each virtual network request. The resource manager is further configured to sort the plurality of virtual network requests based on the number of virtual links, and select a virtual network request from the plurality of virtual network requests and set a number of allowable spans. Additionally, the resource manager is configured to determine whether a valid virtual node mapping exists for the virtual network request on any of a plurality of wavelengths based on the allowable spans, and based on determining that no valid virtual node mapping exists on any of the plurality of wavelengths, increment the number of allowable spans.

In accordance with another embodiment of the present disclosure, non-transitory computer-readable storage medium comprising logic for virtual network requests that when executed by a processor is operable to receive a plurality of virtual network requests and determine a number of virtual links for each virtual network request. The logic is also operable to sort the plurality of virtual network requests based on the number of virtual links, select a virtual network request from the plurality of virtual network requests and set a number of allowable spans. Further, the logic is operable to determine whether a valid virtual node mapping exists for the virtual network request on any of a plurality of wavelengths based on the allowable spans, and based on determining that no valid virtual node mapping exists on any of the plurality of wavelengths, increment the number of allowable spans.

DETAILED DESCRIPTION

Embodiments of the present invention and its advantages are best understood by referring to FIGS. 1-14 of the drawings, like numerals being used for like and corresponding parts of the various drawings.

Figure 1:
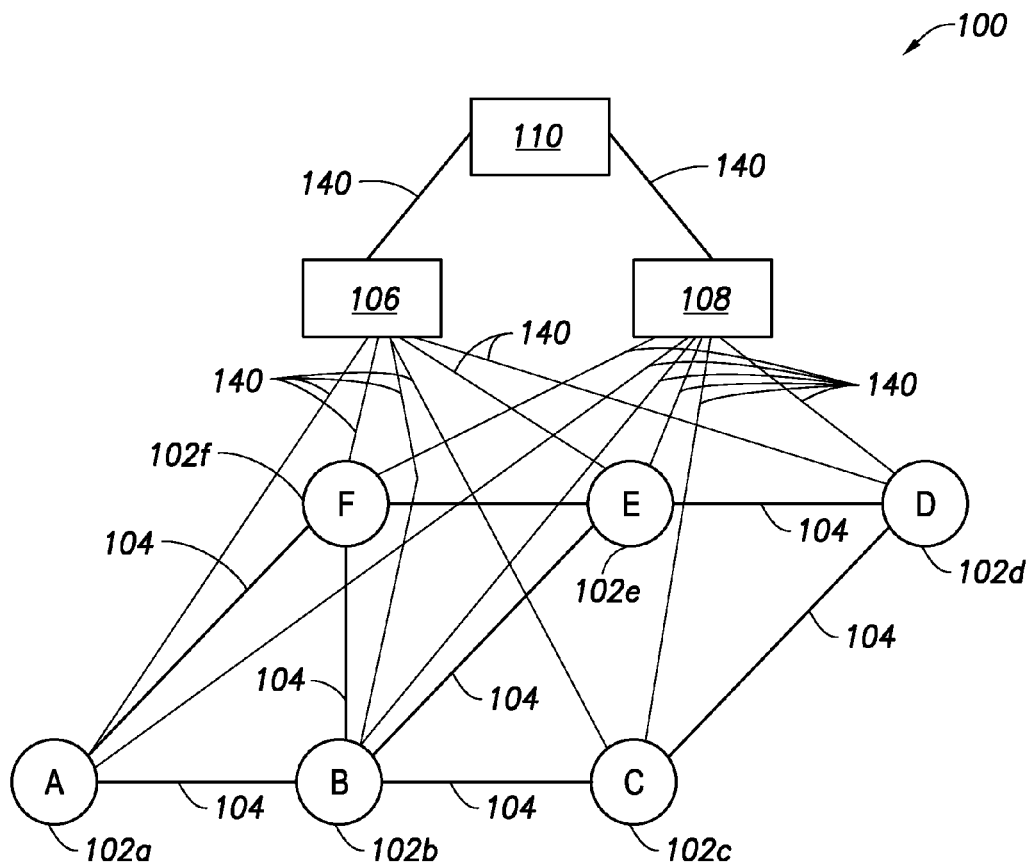
FIG. 1 illustrates a block diagram of an example optical network, in accordance with one embodiment of the present disclosure.

FIG. 1 illustrates a block diagram of an example optical network 100, in accordance with one embodiment of the present disclosure. Optical network 100 may include physical nodes 102a-102f, collectively referred to as physical nodes 102, coupled by physical links 104. During operation, a particular physical node 102 communicates data with other physical nodes 102 and/or other components of optical network 100 by optical signals propagating on physical links 104 at appropriate wavelengths. To simplify the routing and storage of data, optical network 100 may support the creation and use of virtual networks (VNs). Because optical network 100 may support multiple applications that require geographically dispersed and/or persistent connection computing resources (e.g., geographical service distribution for customer service, video streaming, data back-up, or large-scale and/or real-time processing of geographically distributed data), the use of VNs may serve to provide efficient utilization of network resources. Optical network 100 may employ a VN mapping scheme to map virtual nodes to physical nodes 102. Additionally, optical network 100 may include routing and wavelength assignment (RWA) algorithms. Network virtualization for supporting Internet services, e.g., cloud services, may include decoupling and isolating VNs from underlying physical infrastructures, e.g., optical network 100.

In certain embodiments, optical network 100 may be any network utilized for telecommunications, data communications, and/or any other suitable function. Although FIG. 1 illustrates a particular embodiment and configuration of optical network 100, other suitable types of optical networks may be utilized. Optical network 100 may be a point-to-point optical network with terminal nodes, a ring optical network, a mesh optical network, or any other suitable optical network or combination of optical networks. In certain embodiments, optical network 100 may include a number of optical channels that are carried over a common path at different wavelengths. Optical network 100 may include one or more optical fibers or links 104 configured to transport one or more optical signals communicated by an optical network resource or physical node 102. To increase the information carrying capabilities of optical network 100, multiple signals transmitted at multiple channels may be combined into a single optical signal. The process of communicating information at multiple channels of a single optical signal is referred to as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques may be employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Accordingly, optical network 100 may be a WDM network, a DWDM network, or any other suitable multi-channel network. Optical network 100 may represent all or a portion of a short-haul metropolitan network, a wide area network, or any other suitable network or combination of networks.

In certain embodiments, each physical node 102 in optical network 100 may include any suitable system operable to transmit and receive traffic. Physical nodes 102 of optical network 100, coupled by links 104, may include servers, computers, data centers, storage media, transmitters, multiplexers (MUX), amplifiers, optical add/drop multiplexers (OADM), receivers, and/or any other suitable components. Physical nodes 102 may be referred to as "data center nodes" or "local nodes." In the illustrated embodiment, each physical node 102 may be operable to transmit traffic directly to and/or receive traffic directly from one or more other physical node 102 connected by a particular physical link 104. Further, physical node 102 may be capable of receiving traffic from and/sending traffic to components external to optical network 100 through an external connection. For example, external connections may connect optical network 100 to other optical networks including those similar in structure and operation to optical network 100.

For ease of reference, physical nodes 102a-102f may be referred to as physical nodes A-F. For example, physical node 102a may be referred to as physical node A. Physical node 102b may be referred to as physical node B. Physical node 102c may be referred to as physical node C. Additionally, physical nodes 102d, 102e, and 102f may be referred to as physical nodes D, E, and F, respectively.

As used herein, "traffic" means information transmitted, stored, or sorted in the network. Such traffic may comprise optical signals having at least one characteristic modulated to encode audio, video, textual, real-time, non-real-time and/or other suitable data. Modulation may be based on phase shift keying (PSK), intensity modulation (IM), and/or other suitable methodologies. Additionally, the information carried by this traffic may be structured in any suitable manner. Although the description below focuses on an embodiment of optical network 100 that communicates traffic in the form of packets, optical network 100 may be configured to communicate traffic structured in the form of optical frames, as packets, or in any other appropriate manner.

Additionally, optical network 100 supports one or more VNs (not shown) that each represent a logical grouping of devices coupled to physical nodes 102 and/or coupled to other networks. For example, in a particular embodiment, all computers associated with a company may be members of a single VN even though those computers are geographically distributed. In general, VNs may represent any suitable groupings of any appropriate devices within optical network 100 and/or devices coupling to network through an external connection. Nonetheless, the description below focuses, for purposes of illustration, on an embodiment of optical network 100 in which VNs represent groupings of devices coupled to ports of physical nodes 102 within optical network 100. A VN may include virtual nodes that may be connected by virtual links. Virtual nodes may be assigned to physical nodes 102 and virtual links may be assigned to one or more physical links 104.

Optical fibers or physical links 104 may be thin strands of glass capable of communicating signals over long distances with very low loss. Physical links 104 may be any suitable type of fiber, such as a Single-Mode Fiber (SMF), Enhanced Large Effective Area Fiber (ELEAF), or a TrueWave® Reduced Slope (TW-RS) fiber. Optical network 100 may include devices configured to transmit optical signals over physical links 104. Information may be transmitted and received through optical network 100 by modulation of one or more wavelengths of light to encode the information on the wavelength. In optical networking, a wavelength of light may also be referred to as a channel. Each channel may be configured to carry a certain amount of information through optical network 100.

For ease of reference, each physical link 104 may be referred to with reference to the particular physical nodes 102 that each physical link 104 couples. For example, physical link 104 between physical nodes A and B may be referred to as physical link (A, B). As another example, physical link 104 between physical nodes B and E may be referred to as physical link (B, E).

In certain embodiments, optical network 100 may include network resource manager (NRM) 106, computing resource manager (CRM) 108, and/or resource manager 110. NRM 106 may collect, transmit, and/or manage network resources and/or resource availability information regarding physical nodes 102 and/or physical links 104. NRM 106 may transmit network availability information to resource manager 110 and/or any other suitable component. NRM 106 may be a server (e.g., a network management server), database, or other computing system that may be remotely coupled to resource manager 110 and/or physical nodes 102 via one or more channels 140. NRM 106 may include a processor, memory, a management controller, network ports, and/or any other suitable components. Alternatively, NRM 106 may be a hardware, software, and/or firmware component of resource manager 110. A processor associated with NRM 106 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In certain embodiments, a processor may interpret and/or execute program instructions and/or process data, for example, data stored in, memory, a management controller, and/or another component of NRM 106. A processor may output results via graphical user interfaces (GUIs), websites, and the like via a display, over channels 140 (e.g., out of band channels and/or in-band channels), and/or over a network port. A memory associated with NRM 106 may be coupled to a processor and may comprise any system, device, or apparatus operable to retain program instructions or data for a period of time. A memory may include random access memory (RAM), electrically erasable programmable read-only memory (EEPROM), a PCMCIA card, flash memory, or any suitable selection and/or array of volatile or non-volatile memory configured to retain data after power NRM 106 is turned off. In certain embodiments, a memory may store program instructions, tasks, policies data, and/or other data.

CRM 108 may collect, transmit, and/or manage computation resource availability for the computing resources associated with physical nodes 102. CRM 108 may transmit computational availability information to resource manager 110 and/or any other suitable component. CRM 108 may be a server (e.g., a network management server), database, or other computing system that may be remotely coupled to resource manager 110 and/or physical nodes 102 via one or more channels 140. CRM 108 may include a processor, memory, a management controller, network ports, and/or any other suitable components. Alternatively, CRM 108 may be a hardware, software, and/or firmware component of resource manager 110. A processor associated with CRM 108 may comprise any system, device, or apparatus operable to interpret and/or execute program instructions and/or process data, and may include, without limitation, a microprocessor, microcontroller, DSP, ASIC, or any other digital or analog circuitry configured to interpret and/or execute program instructions and/or process data. In certain embodiments, a processor may interpret and/or execute program instructions and/or process data, for example, data stored in, memory, a management controller, and/or another component of CRM 108. A processor may output results via GUIs, websites, and the like via a display, over channels 140 (e.g., out of band channels and/or in-band channels), and/or over a network port. A memory associated with CRM 108 may be coupled to a processor and may comprise any system, device, or apparatus operable to retain program instructions or data for a period of time. A memory may include RAM, EEPROM, a PCMCIA card, flash memory, or any suitable selection and/or array of volatile or non-volatile memory configured to retain data after power CRM 108 is turned off. In certain embodiments, a memory may store program instructions, tasks, policies data, and/or other data.

In one embodiment, resource manager 110 may receive VN requests, may calculate virtual node mappings based on resource availability, and may provide results to NRM 106, CRM 104, and/or any other suitable component. Resource manager 110 may be an Infrastructure as a System (IaaS) manager and/or any other suitable manager. Resource manager 110 may be a server (e.g., a network management server), database, or other computing system that may be remotely coupled to NRM 104, CRM 108, and/or physical nodes 102 via one or more channels 140. Resource manager 110 may include a processor, memory, a management controller, network ports, and/or any other suitable components. A processor associated with resource manager 110 may comprise any system, device, or apparatus operable to interpret and/or execute program instructions and/or process data, and may include, without limitation, a microprocessor, microcontroller, DSP, ASIC, or any other digital or analog circuitry configured to interpret and/or execute program instructions and/or process data. In certain embodiments, a processor may interpret and/or execute program instructions and/or process data, for example, data stored in, memory, a management controller, and/or another component of resource manager 110. A processor may output results via GUIs, websites, and the like via a display, over channels 140 (e.g., out of band channels and/or in-band channels), and/or over a network port. A memory associated with resource manager 110 may be coupled to a processor and may comprise any system, device, or apparatus operable to retain program instructions or data for a period of time. A memory may include RAM, EEPROM, a PCMCIA card, flash memory, or any suitable selection and/or array of volatile or non-volatile memory configured to retain data after power resource manager 110 is turned off. In certain embodiments, a memory may store program instructions, tasks, policies data, and/or other data.

Figure 2:
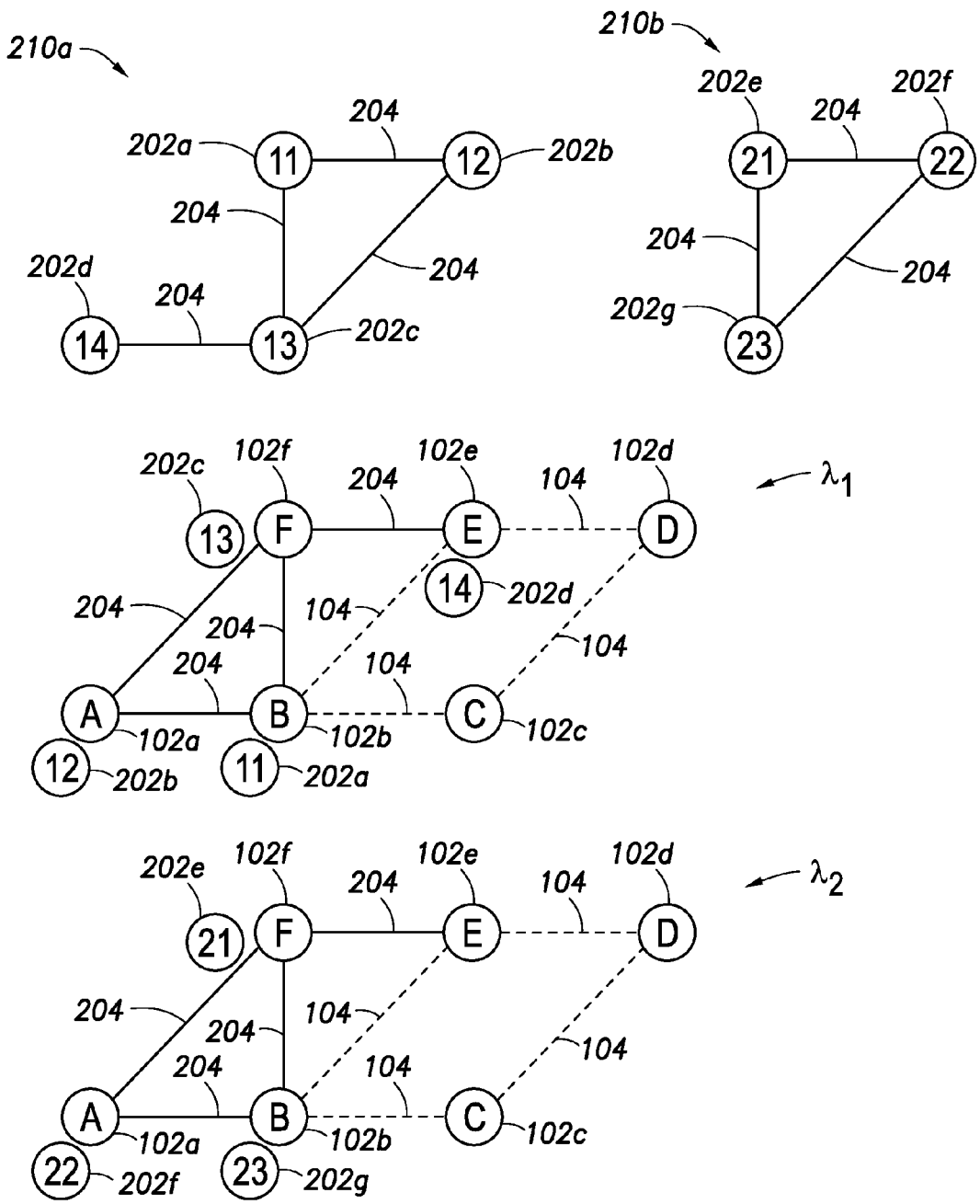
FIG. 2 illustrates an example virtual node mapping to an optical network utilizing a Min_Span methodology, in accordance with one embodiment of the present disclosure.

FIG. 2 illustrates an example virtual node mapping 200 to optical network 100 utilizing a Min_Span methodology, in accordance with one embodiment of the present disclosure. Optical network 100 may receive VN requests 210a and 210b shown as virtual nodes 202a-202g, collectively referred to as virtual nodes 202. Virtual nodes 202 may be communicatively coupled by virtual links 204. For ease of reference, virtual nodes 202a-202g may be numbered. For example, virtual node 202a may be referred to as virtual node 11. Virtual node 202b may be referred to as virtual node 12, and virtual node 202c may be referred to as virtual node 13. Additionally, virtual node 12 may be linked to virtual node 11 and 13. Virtual node 202d may be referred to virtual node 14. Virtual node 13 may be linked to virtual node 11 and 14. Virtual nodes 11, 12, 13, and 14 may represent VN request 210a. In one embodiment, virtual node 202e may be referred to as virtual node 21, and virtual node 202f may be referred to as virtual node 22. Additionally, virtual node 202g may be referred to as virtual node 23 and may be linked by virtual links 204 to both virtual node 22 and 21. Virtual node 21 may also be linked to virtual node 22. Virtual nodes 21, 22 and 23 may represent VN request 210b. Virtual nodal degree may refer to the number of virtual links 204 at each virtual node. For example, virtual node 13 may have a virtual nodal degree of three. As another example virtual node 14 may have a virtual nodal degree of one. Further, for ease of reference, a particular virtual link 204 that couples two virtual nodes 202 may be referred to as a virtual link (node 1, node 2). For example, virtual link 204 between virtual nodes 12 and 13 may be referred to as virtual link (12, 13).

In one embodiment, the Min_Span methodology may set a maximum number of spans (or physical links 104), i, for each particular virtual link 204. For example, in FIG. 2, $Span_{max}$ may be set to less than or equal to one, e.g., $Span_{max} \leq i$, $i=1$. As such, in order to map VN requests 210a and 210b, VN mapping 200 may utilize two wavelengths, $\lambda_1$ and $\lambda_2$, of optical network 100. VN request 210a on virtual nodes 11-14 may be mapped to physical nodes A, B, E, and F on wavelength $\lambda_1$. Virtual nodes 11-14 may be mapped to physical nodes A, B, E, and F so that virtual links 204 traverse only one span. For example, virtual node 11 may be mapped to physical node B, and virtual node 12 may be mapped to physical node A. Virtual node 13 may be mapped to physical node F, and virtual node 14 may be mapped to physical node E.

Because there is no valid one span mapping ($Span_{max} \leq 1$) on wavelength $\lambda_1$ for VN request 210b, VN request 210b may be mapped utilizing wavelength $\lambda_2$. Thus, virtual nodes 21-23 may be mapped to physical nodes A, B, and F on wavelength $\lambda_2$. Virtual nodes 21-23 may be mapped to physical nodes A, B, and F so that virtual links 204 traverse only one span. For example, virtual node 21 may be mapped to physical node F, virtual node 22 may be mapped to physical node A, and virtual node 23 may be mapped to physical node B. In the current embodiment, each of the virtual links 204 may span less than a set maximum number of spans. Accordingly, virtual node mapping 200 may require two wavelengths and seven wavelength spans. Virtual node mapping to span less than a set maximum number of spans may be termed Min_Span mapping.

Figure 3:
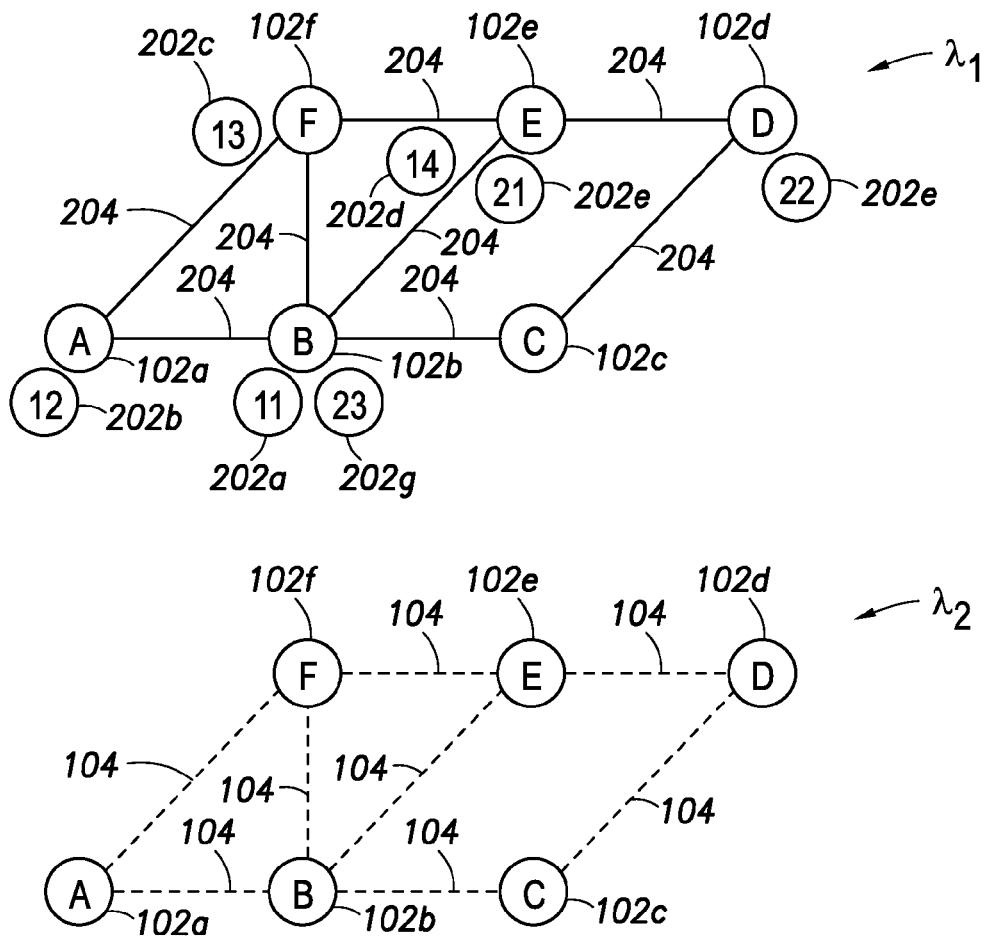
FIG. 3 illustrates an example virtual node mapping to an optical network utilizing a Min_Wavelength methodology, in accordance with one embodiment of the present disclosure.

FIG. 3 illustrates an example virtual node mapping 300 to optical network 100 utilizing a Min_Wavelength methodology, in accordance with one embodiment of the present disclosure. Wavelength index W may be the maximum number of wavelength layers utilized in a particular mapping. Minimizing the number of wavelength layers utilized for virtual node mapping may conserve network resources. In the Min_Wavelength methodology, a particular maximum wavelength index, e.g., $W_{max}$, may be set. For example, the number of wavelengths λ used for virtual node mapping may be set to a maximum number such as one, e.g., $W_{max}=1$ or maxLayer=1. Utilizing this constraint in the current example, VN requests 210a and 210b may be mapped to one wavelength $\lambda_1$. For example, VN request 210a on virtual nodes 11-14 may be mapped to physical nodes A, B, E, and F on wavelength $\lambda_1$. Virtual nodes 11-14 may be mapped to physical nodes A, B, E, and F in a manner to maintain virtual links 204. For example, virtual node 11 may be mapped to physical node B, and virtual node 12 may be mapped to physical node A. As another example, virtual node 13 may be mapped to physical node F, and virtual node 14 may be mapped to physical node E. VN request 210b on virtual nodes 21-23 may also be mapped to physical nodes B, D and E on wavelength $\lambda_1$. Virtual nodes 21-23 may be mapped to physical nodes B, D, and E in a manner to maintain virtual links 204. For example, virtual node 21 may be mapped to physical node E, virtual node 22 may be mapped to physical node B, and virtual node 23 may be mapped to physical node D. In the current embodiment, physical nodes B and E may be receiving multiple VN requests and may be mapped to multiple virtual nodes.

In one embodiment, each virtual link 204 may require a lightpath. A lightpath is a defined path for traffic to follow regardless of the number of physical links 104 traversed. For example, with reference to FIG. 3, the lightpath for traffic between virtual nodes 22 and 23 traverses two physical links 104, e.g., physical link (B, C) and physical link (C, D).

VN mapping 300 may utilize one wavelength and eight wavelength spans. VN mapping that is set to utilize a maximum number of wavelengths, e.g., maxLayer=1, may be termed Min_Wavelength methodology or Min_Wavelength mapping. Accordingly, virtual node mapping methodology, such as Min_Span mapping shown in FIG. 2 or Min_Wavelength mapping shown in FIG. 3, may impact RWA in optical networks, e.g., optical WDM networks, and thus, network costs. Hence, virtual node mapping schemes in optical networks may be varied and configured to minimize network cost.

In one embodiment, utilizing Min_Span mapping and Min_Wavelength mapping may jointly consider virtual node mapping and RWA to minimize network resources. In one embodiment, one objective may be to balance computing resources required at each physical node 102. Such an objective may be subject to the constraint that a virtual node may be mapped to a physical node, a virtual link may be mapped to a lightpath imposing wavelength continuity, and two virtual nodes of the same VN request may be restricted from being mapped to the same physical node. For optical network 100, there may be a determination of virtual node mapping of each virtual node 202, the RWA for each virtual link 204, and the total computing capacity that may be required at each physical node 102.

To employ either Min_Span mapping and/or Min_Wavelength, each virtual node 202 may be allocated to any node in a set of candidate physical nodes 102. Such an allocation may utilize the resource allocation flexibility provided by network virtualization. VN requests 210 may indicate each virtual node v that may require certain computing resources and may be mapped to a set of candidate nodes $c_v$. Candidate nodes $c_v$ physical distance from a central physical node $n_v$ may be less than $d_v$. The tuple $(n_v, d_v)$ may provide the flexibility of virtual node mapping. Selection of a valid virtual node mapping from a set of candidate nodes may be accomplished by employing i_spanMapping methodology discussed below with reference to FIGS. 4 and 5.

Figure 4:
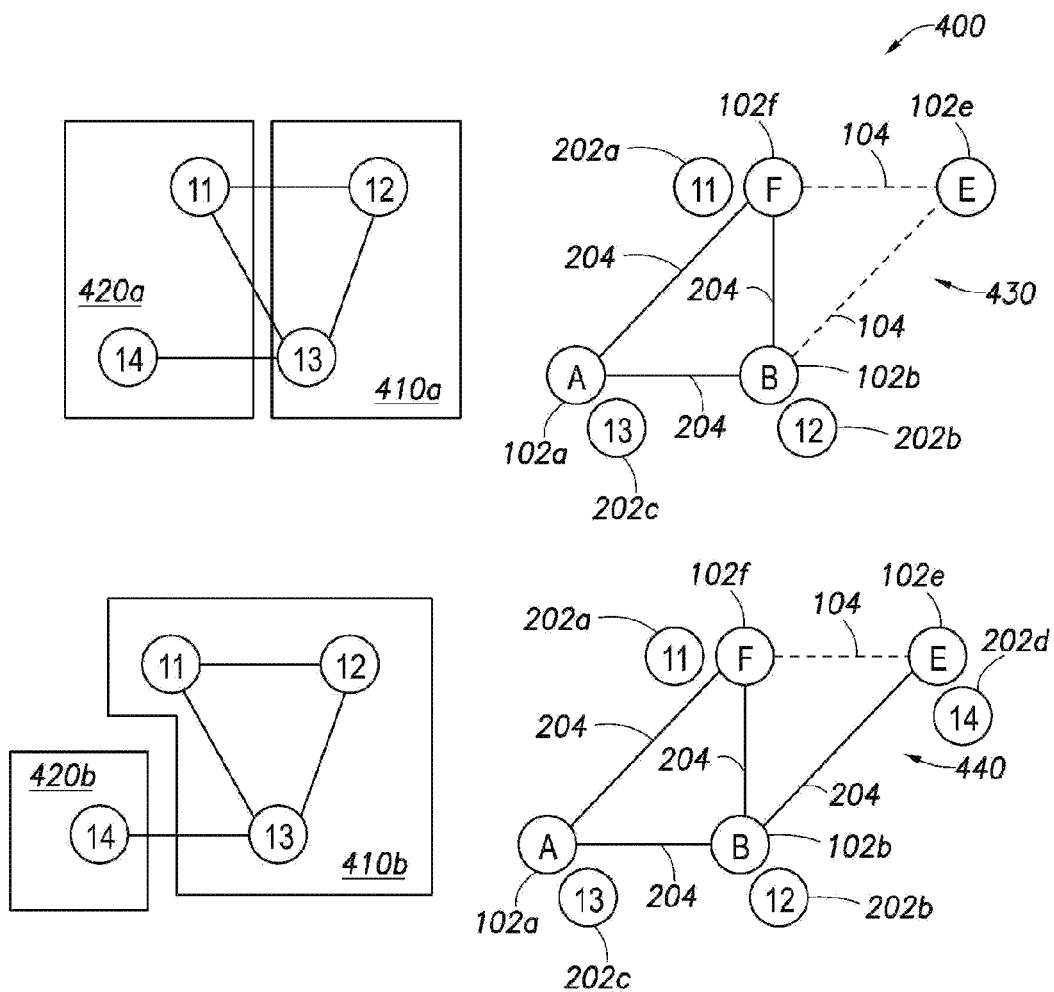
FIG. 4 illustrates an example candidate node mapping for virtual nodes utilizing an i-span mapping methodology discussed with reference to FIG. 5, in accordance with one embodiment of the present disclosure.

FIG. 4 illustrates an example candidate node mapping 400 for virtual nodes 204 utilizing i-span mapping methodology discussed below in FIG. 5, in accordance with one embodiment of the present disclosure. I-span mapping methodology may be termed "candidate node mapping," "i_spanMapping," or "i-span mapping" Candidate node mapping may search for valid candidate nodes for a particular virtual node given the assignment of a portion or all of the other virtual nodes in the particular VN request. For example, a virtual node assignment or mapping may be determined for VN request 210a, shown with reference to FIG. 2. The initial iteration of mapping may be restricted to a span of one, e.g., maxSpan=1. During mapping, virtual node 13 may be mapped to physical node A, e.g., (13, A), and virtual node 12 may be mapped to physical node B, e.g., (12, B). The set of mapped nodes 410a may include virtual nodes 12 and 13. Thus, mapped nodes may consist of {(13, A), (12, B)}. The set of remaining unmapped nodes 420a may include virtual nodes 11 and 14. The set of candidates nodes available, e.g., c, may include {(11, F), (11, E), (14, F), (14, E)}. It may be determined that, within the constraints of the optical network, virtual node 11 may be mapped physical node F, e.g., (11, F), shown in proposed mapping 430. Based on the mapping of virtual node 11, the only remaining unmapped node 420b may be virtual node 14. However, the remaining candidate node mapping, e.g., (14, E), may not be valid because there is no one span path between physical nodes A and E for virtual link (13, 14). Thus, the i_spanMapping methodology may backtrack and return to the mapping (11, F) to re-map virtual node 11 to the next candidate node (11, E). The i_spanMapping methodology may backtrack and cycle through multiple iterations until a valid virtual node mapping if found.

Accordingly, for one embodiment, the i_spanMapping methodology may, utilize the following equation to sort candidate physical nodes for each virtual node in a descending order for a metric ($m_n$):

$$m_n = P_n \times (\Sigma \exp(-1/x_w))/\text{maxLayer} + (\text{maxNodeUsage} - \text{nodeUsage}_n)/\text{maxNodeUsage}, \quad (1)$$

where:
n=candidate physical nodes
$x_w$=the number of physical nodes that have available path to n at the $w^{th}$ wavelength layer;
maxNodeUsage=the maximum computing resources required among all physical nodes;
nodeUsage$_n$=the computing resources required at n, which are used for balancing computing resources among physical nodes; and $$P_n = 1/P_{mapped} + \alpha \times 1/P_{unmapped};$$

where:
$P_{mapped}$=the average spans between n and the mapped physical nodes;
$P_{unmapped}$=the average spans between n and the unmapped physical nodes; and
α=the ratio of unmapped virtual links and the total virtual links at v.

Use of Equation (1) may reduce WDM network resources, as well as balance computing resource load at physical nodes 102. For example, if virtual node v is mapped to a candidate node of higher $P_n$, then virtual links may have fewer spans. As another example, if virtual node v is mapped to a candidate node of higher $\Sigma \exp(-1/x_w)$, it is less likely to fragment the wavelengths. MaxNodeUsage is the maximum computing resources load required among all physical nodes and nodeUsage$_n$ is the computing resource loads required at candidate physical node n, which may be used for balancing computing resources resource load among physical nodes.

Figure 5:
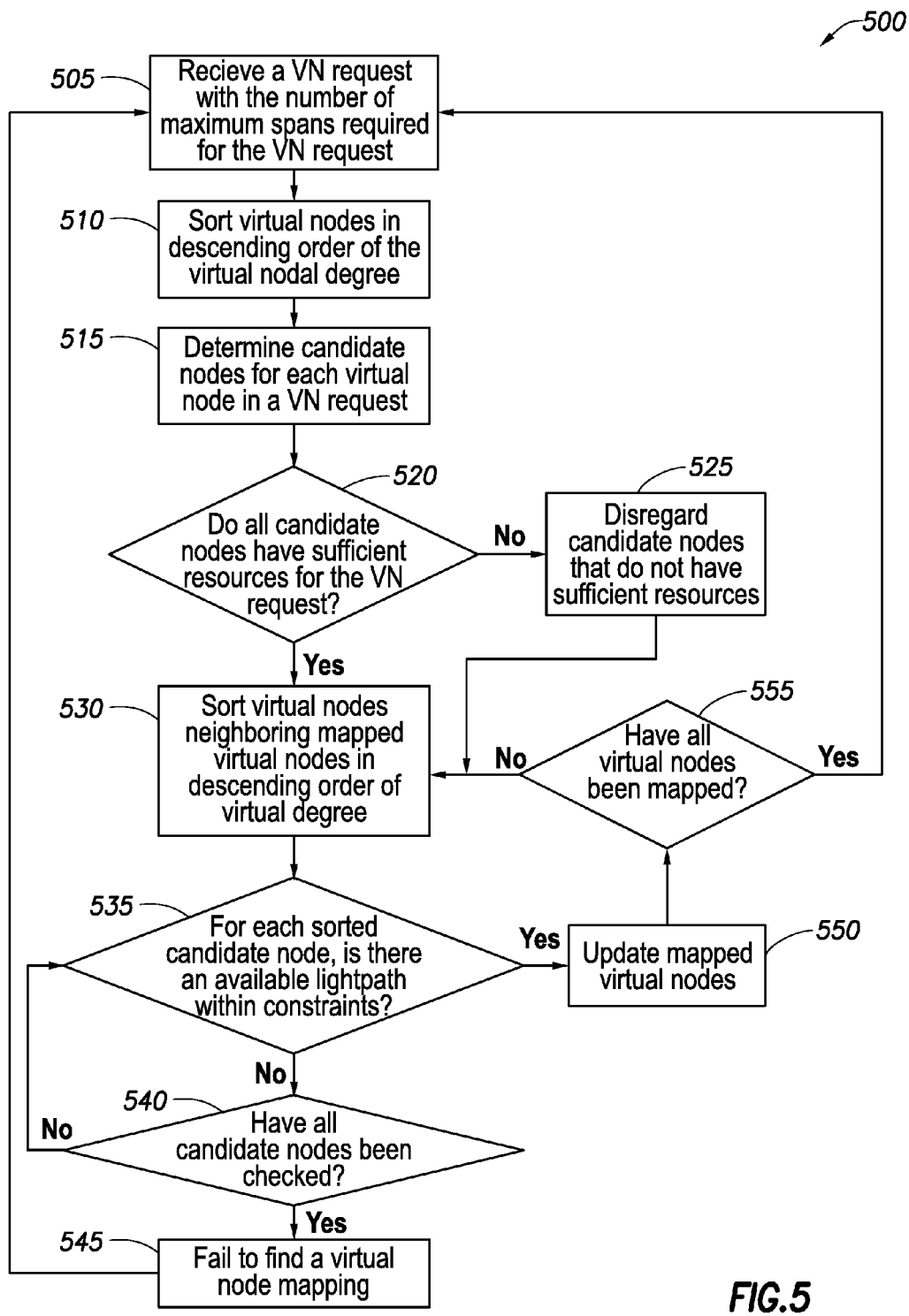
FIG. 5 illustrates a method for virtual node mapping utilizing an i-span mapping methodology, in accordance with one embodiment of the present disclosure.

FIG. 5 illustrates a method 500 for virtual node mapping utilizing a i-span mapping methodology, in accordance with one embodiment of the present disclosure. Method 500 may be utilized in both Min_Span methodology discussed below with reference to FIG. 6 and Min_Wavelength methodology discussed below with reference to FIG. 7. I-span mapping may be utilized to find a virtual node mapping that considers optical network features, such as wavelength assignment, wavelength spans, and wavelength fragmentation. Method 500 may be implemented fully or in part by optical network 100 of FIGS. 1-3. The steps of method 500 may be performed by hardware, software, firmware or any combination thereof, configured to perform spanning tree tunneling and peeing. The software or firmware may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The software or firmware may be configured to direct a processor or other suitable unit to retrieve and execute the instructions from the computer-readable media. For illustrative purposes, method 500 is described with respect to network 100 of FIGS. 1-3; however, method 500 may be used for virtual node mapping on any suitable network.

Method 500 may be performed in association with VN requests, such as VN requests 210, received at a resource manager, e.g., resource manager 110 of FIG. 1. Method 500 may be repeated or performed in parallel for each one of the sets of VN requests. In addition, although FIG. 5 discloses a certain order of steps to be taken with respect to method 500, the steps comprising method 500 may be completed in any suitable order.

At step 505, a resource manager, such as resource manager 110 may receive a VN request (r), such as VN requests 210, with the number of maximum spans (i) required for the VN request r. At step 510, the resource manager may sort the virtual nodes in descending order of the virtual nodal degree. For example, resource manager 110 may receive VN request 210a shown in FIG. 2. Resource manager 110 may first map a virtual node of the highest virtual nodal degree in request 210a. Virtual node 13 has virtual nodal degree of three, and virtual nodes 12, 11, and 14 has virtual nodal degrees of two, two, and one, respectively. Hence, virtual node 13 may be mapped first. The next virtual node may have the highest virtual nodal degree among the neighboring virtual nodes of valid mapped virtual nodes.

At step 515, the resource manager may determine candidate physical nodes {n} for each virtual node $v_i$ that makes up a VN request. The determination may be based on virtual node $v_i$ being less than a physical distance $d_v$ from a central physical node $n_v$, e.g., a given ($n_v$, $d_v$). For example, with reference to FIG. 4, candidate nodes for unmapped virtual nodes in VN request 210a may include {(11, F), (11, E), (14, F), (14, E)}.

At step 520, the resource manager may determine if all candidate nodes have sufficient computing resources for the VN request. If all candidate nodes do not have sufficient computing resources, at step 525, the resource manager may disregard candidate nodes that do not have sufficient computing resources for the VN request. For example, resource manager 110 may delete candidate nodes that do not have the computing resources to complete VN request 210a.

At step 530, the resource manager may sort, e.g., utilize the sort( ) function, neighboring virtual nodes of mapped virtual nodes in a descending order of virtual nodal degree. For each virtual node v, method 400 may sort its candidate physical nodes, n, in a descending order of a metric ($m_n$) defined in equation (1) discussed with reference to FIG. 4.

At step 535, for each candidate node n in the sorted set of candidate nodes {n}, the resource manager may determine if each virtual link has an available lightpath subject to the mapping constraints. Mapping constraints may be set based upon the constraints of the physical network, e.g., within maxLayer wavelength layers, and/or within i spans of the same wavelength. This determination may be made utilizing a valid( ) function to validate the mapping. For example, resource manager 110 may set maxLayer equal to one and i equal to one. If the current mapping is not valid, then method 500 may proceed to step 540. If the current mapping is valid, then method 500 may proceed to step 555.

At step 540, the resource manager may determine if all candidate nodes have been checked. If candidate nodes remain to be checked, the method 500 may return to step 535. If no candidate nodes remain, then method 500 may proceed to step 545. At step 545, the resource manager may record the failure of mapping the given VN request and return to step 515.

At step 550, the resource manager may update the mapped virtual nodes. At step 555, the resource manage may determine if all virtual nodes are mapped. If all virtual nodes are not mapped, method 500 may return to step 515. If all virtual nodes are mapped, method 500 may return to step 505.

Figure 6:
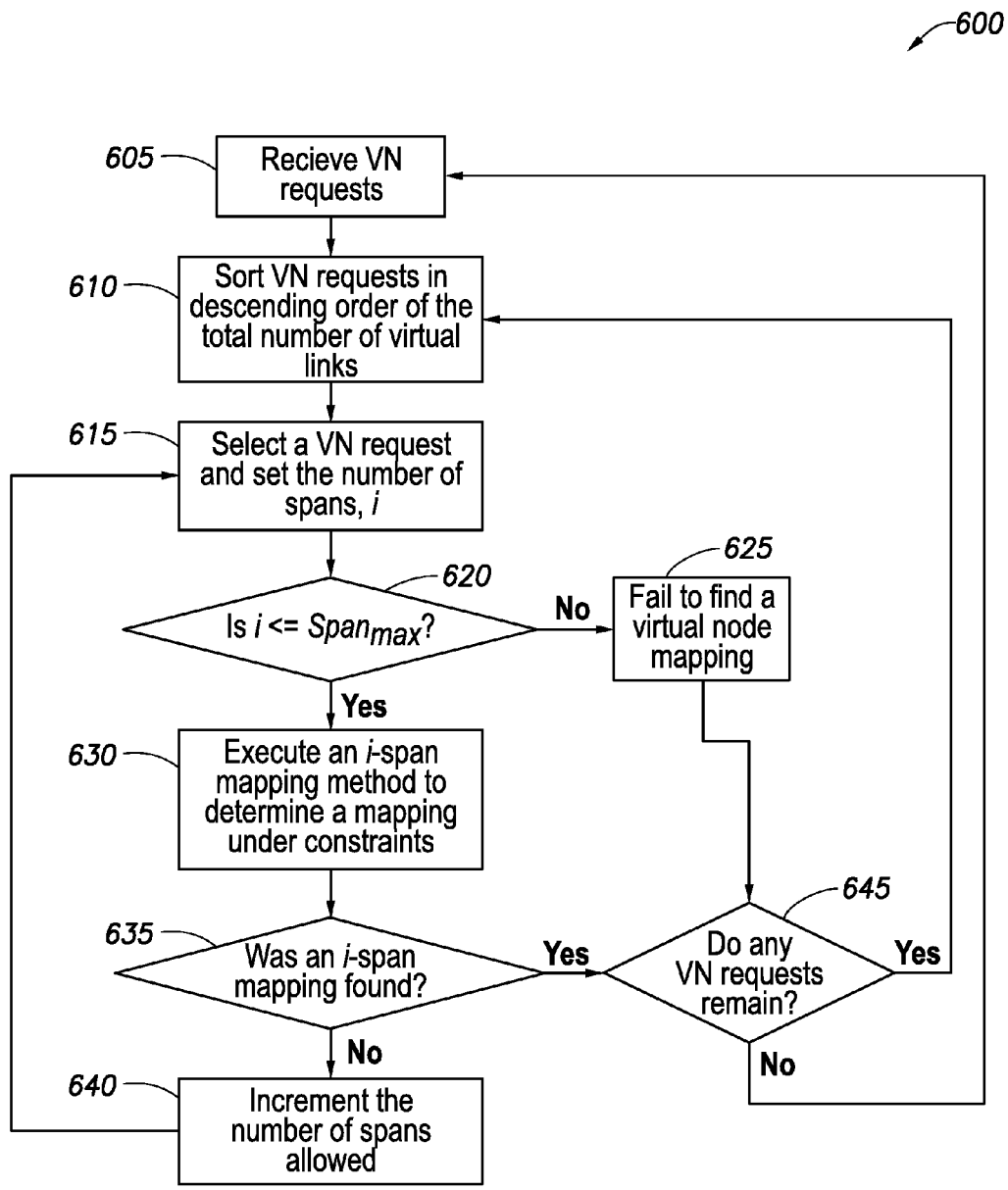
FIG. 6 illustrates a method for virtual node mapping utilizing a Min_Span methodology, in accordance with one embodiment of the present disclosure.

FIG. 6 illustrates a method 600 for virtual node mapping utilizing a Min_Span methodology, in accordance with one embodiment of the present disclosure. As noted above, a Min_Span methodology may attempt to find a virtual node mapping with the fewest wavelength spans. Method 600 may be implemented fully or in part by optical network 100 of FIGS. 1-3. The steps of method 600 may be performed by hardware, software, firmware or any combination thereof, configured to perform spanning tree tunneling and peeing. The software or firmware may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The software or firmware may be configured to direct a processor or other suitable unit to retrieve and execute the instructions from the computer-readable media. For illustrative purposes, method 600 is described with respect to network 100 of FIGS. 1-3; however, method 600 may be used for virtual node mapping on any suitable network.

Method 600 may be performed in association with VN requests, such as VN requests 210, received at a resource manager, e.g., resource manager 110 of FIG. 1. Method 600 may be repeated or performed in parallel for each one of the sets of VN requests. In addition, although FIG. 6 discloses a certain order of steps to be taken with respect to method 600, the steps comprising method 600 may be completed in any suitable order.

At step 605, a resource manager, such as resource manager 110 may receive sets of VN requests (r), such as VN requests 210. At step 610, the resource manager may sort the VN request in a descending order of the total number of virtual links in each VN request. For example, resource manager 110 may receive VN requests 210a and 210b shown in FIG. 2. Resource manager 110 may sort VN requests 210a and 210b in descending order of total number of virtual links 204. Thus, the VN requests may be sorted as VN request 210a (with four virtual links 204) then VN request 210b (with three virtual links 204).

At step 615, the resource manager may select a VN request (r=r+1) and set the number of spans (i) required for the selected VN request. Spans (i) may correspond to the number of physical links required for a lightpath for each virtual link. Each virtual link in the VN request may only be mapped to a lightpath that does not exceed i spans or physical links. For example, resource manger 110 may select VN request 210a and set the number of physical links 104 or spans allowed for the lightpath of each virtual link 204 to one (i=1).

At step 620, the resource manager may determine if the number of spans (i) for the selected VN request is less than or equal to a maximum number of spans allowed ($Span_{max}$). $Span_{max}$ may be predetermined or set by resource manager based upon the topology of the optical network. For example, $Span_{max}$ may be set to five. If the number of spans (i) for the selected VN request is less than or equal to $Span_{max}$, then method 600 may proceed to step 630. If number of spans (i) for the selected VN requests greater than $Span_{max}$, method 600 may proceed to step 625.

At step 625, the resource manager may determine that no virtual node mapping exists under the current constraints for the selected set of VN requests.

At step 630, the resource manager may execute an i-span mapping method, such as method 500 discussed in detail below with reference to FIG. 5, on all wavelengths ($W_{max}$) with the constraint of i-spans. For example, with reference to FIG. 2, a 1-span mapping at the second wavelength layer, λ2, is found for VN request 210b.

At step 635, the resource manager may determine if an i-span mapping was found. If no i-span mapping was found, then method 600 may proceed to step 640. If an i-span mapping is found, method 600 may proceed to step 645.

At step 640, the resource manager may increment the number of spans (i=i+1) and return to step 620. For example, resource manager 110 may search for an 1-span mapping for a particular VN request on all wavelengths ($W_{max}$), and may not be able to find a successful 1-span map for that particular VN request. Resource manage 110 may increment the span to a 2-span mapping and return to step 620.

At step 645, the resource manager may determine if all of the VN requests have been mapped. For example, resource manager 110 may determine if there are any pending VN requests for optical network 100. If all VN request have not been mapped, then method 600 may return to step 615. If there are remaining VN requests to be mapped, method 600 may return to step 605.

As discussed, method 600 searches all wavelengths up to the maximum wavelength $W_{max}$ to find virtual node mappings with the minimum number of spans. As such, the wavelength index, which is the maximum number of wavelengths utilized for a VN, may be higher than a mapping that does not attempt to minimize the number of spans.

Figure 7:
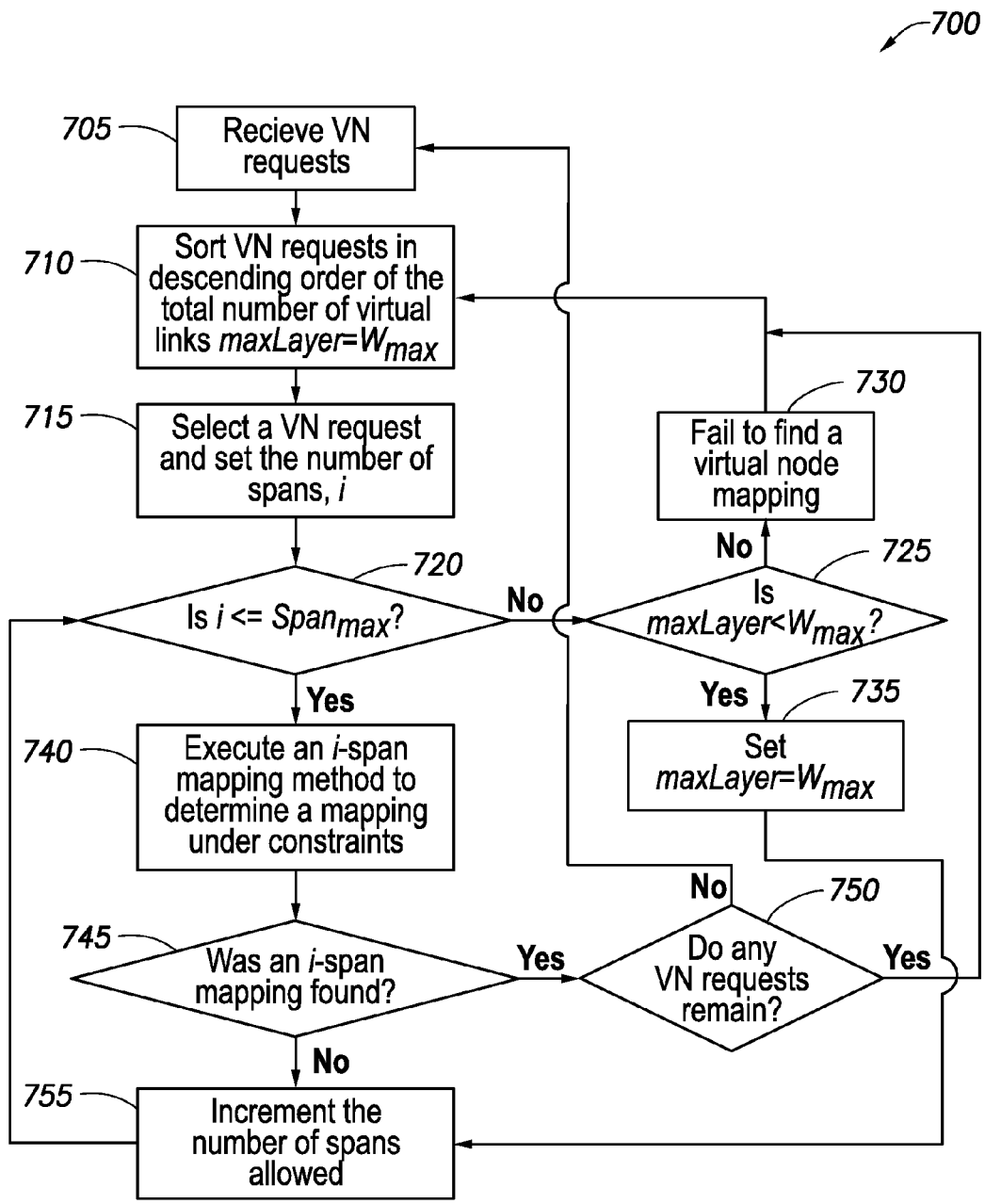
FIG. 7 illustrates a method for virtual node mapping utilizing a Min_Wavelength methodology, in accordance with one embodiment of the present disclosure.

FIG. 7 illustrates a method 700 for virtual node mapping utilizing a Min_Wavelength methodology, in accordance with one embodiment of the present disclosure. As noted above, a Min_Wavelength methodology may attempt to find a virtual node mapping by dynamically limiting the maximum wavelength layer index (maxLayer) allowed for each virtual node mapping. Method 700 may be implemented fully or in part by optical network 100 of FIGS. 1-3. The steps of method 700 may be performed by hardware, software, firmware or any combination thereof, configured to perform spanning tree tunneling and peeing. The software or firmware may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The software or firmware may be configured to direct a processor or other suitable unit to retrieve and execute the instructions from the computer-readable media. For illustrative purposes, method 700 is described with respect to network 100 of FIGS. 1-3; however, method 700 may be used for virtual node mapping on any suitable network.

Method 700 may be performed in association with VN requests, such as VN requests 210, received at a resource manager, e.g., resource manager 110 of FIG. 1. Method 700 may be repeated or performed in parallel for each VN requests. In addition, although FIG. 7 discloses a certain order of steps to be taken with respect to method 700, the steps comprising method 700 may be completed in any suitable order. Method 700 may be utilized in conjunction and/or concurrently with method 600 of FIG. 6 to optimize network resources.

At step 705, a resource manager, such as resource manager 110 may receive sets of VN requests (r), such as VN requests 210. At step 710, the resource manager may sort the VN request in a descending order of the total number of virtual links in each VN request. For example, resource manager 110 may receive VN requests 210a and 210b shown in FIG. 2. Resource manager 110 may sort VN requests 210a and 210b in descending order of total number of virtual links 204. Thus, the VN requests may be sorted as VN request 210a (with four virtual links 204) then VN request 210b (with three virtual links 204). The maxLayer may be set to equal $W_{max}$.

At step 715, the resource manager may select a VN request (r=r+1) and set the number of spans (i) required for the selected VN request. Spans (i) may correspond to the number of physical links required for a lightpath for each virtual link. Each virtual link in the VN request may only be mapped to a lightpath that does not exceed i spans or physical links. For example, resource manger 110 may select VN request 210a and set the number of physical links 104 or spans allowed for the lightpath of each virtual link 204 to one (i=1).

At step 720, the resource manager may determine if the number of spans (i) for the selected VN request is less than or equal to a maximum number of spans allowed ($Span_{max}$). $Span_{max}$ may be predetermined or set by resource manager based upon the topology of the optical network. For example, $Span_{max}$ may be set to five. If the number of spans (i) for the selected VN request is less than or equal to $Span_{max}$, then method 600 may proceed to step 630. If number of spans (i) for the selected VN requests greater than $Span_{max}$, method 700 may proceed to step 725.

At step 725, the resource manager may determine whether the current maximum wavelength layer maxLayer is less than the maximum wavelength index $W_{max}$. If the current maximum wavelength layer maxLayer is less than $W_{max}$ then method 700 may proceed to step 735. If the current maximum wavelength layer maxLayer is not less than $W_{max}$ then method 700 may proceed to step 730. At step 730, the resource manager may determine that no virtual node mapping exists under the current constraints for the VN request. At step 735, the resource manager may set the current maximum wavelength layer maxLayer to equal $W_{max}$ and method 700 may proceed to step 755. Thus, for each subsequent VN request, method 700 may essentially apply the Min_Span method to find a mapping from the 1st to the maxLayer$^{th}$ wavelength layer.

At step 740, the resource manager may execute an i-span mapping method, such as method 500 discussed in detail below with reference to FIG. 5, on all wavelengths ($W_{max}$) with the constraint of i-spans. For example, with reference to FIG. 2, a 1-span mapping at the second wavelength layer, λ2, is found for VN request 210b.

At step 745, the resource manager may determine if an i-span mapping was found. If no i-span mapping was found, then method 700 may proceed to step 755. If an i-span mapping is found, method 700 may proceed to step 750.

At step 755, the resource manager may increment the number of spans (i=i+1) and return to step 720. For example, resource manager 110 may search for an 1-span mapping for a particular VN request on all wavelengths ($W_{max}$), and may not be able to find a successful 1-span map for that particular VN request. Resource manage 110 may increment the span to a 2-span mapping and return to step 720.

At step 750, the resource manager may determine if all of the VN requests have been mapped. For example, resource manager 110 may determine if there are any pending VN requests for optical network 100. If all VN request have not been mapped, then method 700 may return to step 715. If there are remaining VN requests to be mapped, method 700 may return to step 705.

Accordingly, Min_Wavelength method 700 may optimize the results of Min_Span method 600 by dynamically limiting the maximum wavelength layer index (maxLayer) allowed for each virtual node mapping. Utilization of methods 500, 600 and/or 700 may result in improvements in utilization of network resources. For example, a simulation may be performed utilizing both the Min_Span method and the Min_Wavelength method. The simulation may include for comparison purposes a two-step (Two_Step) approach that separates VN mapping and RWA in optical networks. The first step may apply an existing scheme for VN mapping in an optical network. The second step may also apply graph coloring for wavelength assignment in WDM networks. The Two_Step approach may attempt to balance load for both links and nodes. The fixed shortest path routing between any two physical nodes may be applied to all schemes.

During simulation, a network may include eighty-eight wavelengths per physical link. For each VN request, the number of virtual nodes may be randomly generated between three and five. Each virtual node may have a nodal degree between one and three, and a tuple ($n_v$, $d_v$), which are all randomly generated. Average $d_v$ may be set to increase the average number of candidate nodes per virtual node ($c_v$). The simulation may include one hundred experiments with different random seeds.

Figure 8:
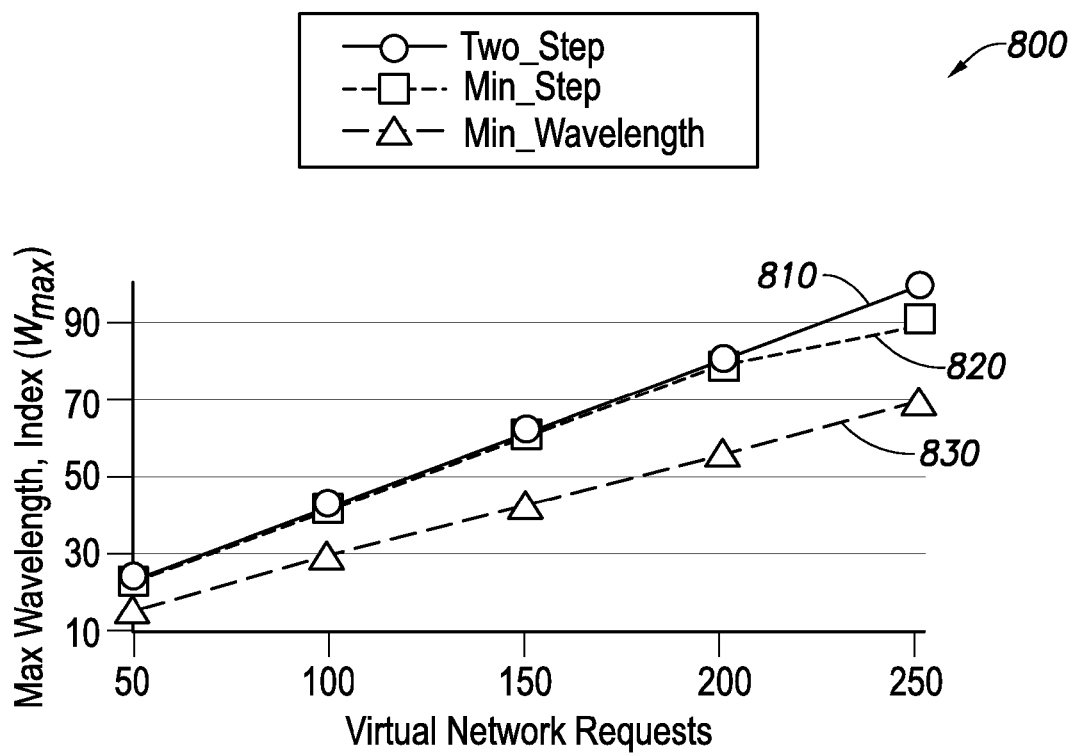
FIG. 8 illustrates a graph of simulation results of wavelength index $W_{max}$ as a function of number of VN requests, in accordance with one embodiment of the present disclosure.

FIG. 8 illustrates graph 800 of simulation results of wavelength index $W_{max}$ as a function of number of VN requests, in accordance with one embodiment of the present disclosure. In the current simulation, candidate nodes per virtual node ($c_v$) is set equal to eight. Graph 800 may include plots for Two_Step method 810, Min_Span method 820, and Min_Wavelength method 830. As can be seen from graph 800, Min_Wavelength 830 may result in a lower maximum wavelength index ($W_{max}$). For example, when the number of requests is approximately two-hundred and fifty, Min_Wavelength 830 requires approximately thirty percent fewer wavelength layers than Two_Step 810. FIG. 4(a) shows that Two-Step requires more than 88 wavelengths when the number of requests is 250 since Two-Step separates virtual node mapping and RWA.

Figure 9:
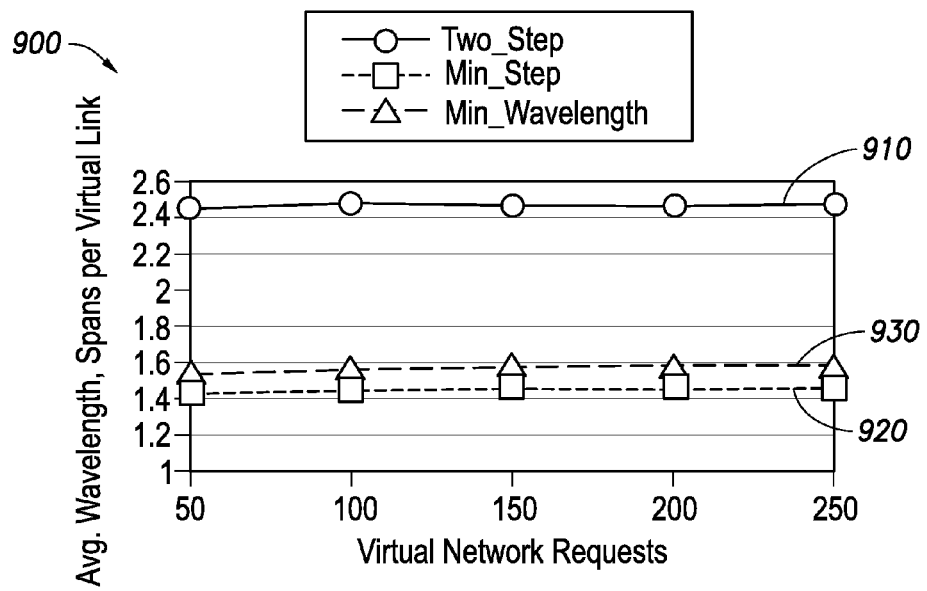
FIG. 9 illustrates a graph of simulation results of average wavelength spans per virtual lengths as a function of number of VN requests, in accordance with one embodiment of the present disclosure.

FIG. 9 illustrates graph 900 of simulation results of average wavelength spans per virtual lengths as a function of number of VN requests, in accordance with one embodiment of the present disclosure. Graph 900 may include plots for Two_Step method 910, Min_Span method 920, and Min_Wavelength method 930. As can be seen from graph 900, Min_Wavelength results in fewer wavelength spans than Two_Step. For example, when the number of requests is approximately two-hundred and fifty, Min_Wavelength 930 requires approximately thirty-five percent fewer wavelength spans than Two_Step 910. FIGS. 8 and 9 illustrate that Min_Wavelength has the lowest $W_{max}$, but slightly more wavelength spans than Min_Span, due to Min_Wavelength imposing the maxLayer limit.

Figure 10:
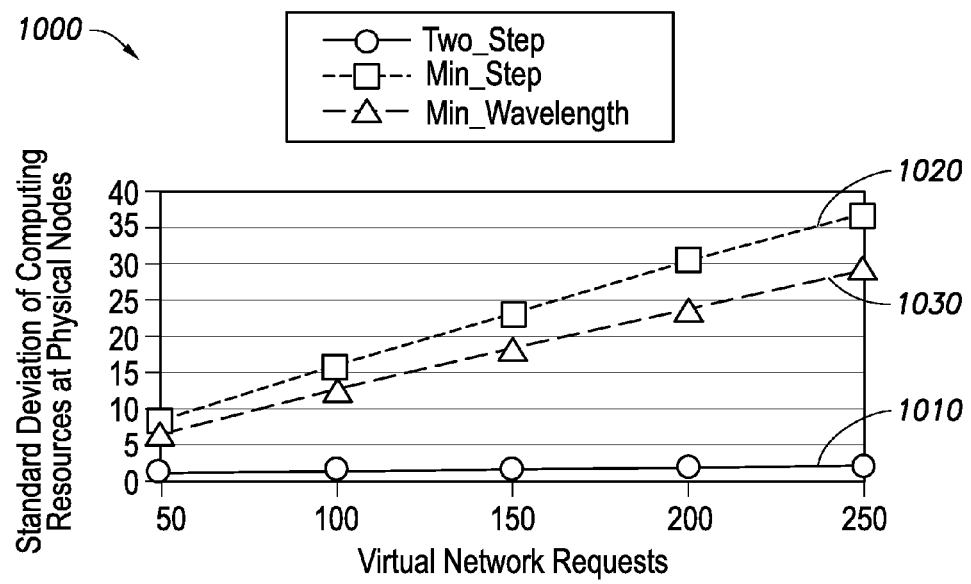
FIG. 10 illustrates a graph of simulation results of standard deviation of computing resources at physical nodes as a function of number of VN requests, in accordance with one embodiment of the present disclosure.

FIG. 10 illustrates a graph simulation results of standard deviation of computing resources at physical nodes as a function of number of VN requests, in accordance with one embodiment of the present disclosure. Graph 1000 may include plots for Two_Step method 1010, Min_Span method 1020, and Min_Wavelength method 1030. Graph 100 illustrates that Min_Wavelength method 1030 and Min_Span method 1120 may have higher standard deviation of computing resource load at physical nodes than Two-Step method 1010. The higher standard deviation may be because both Min_Wavelength method 1030 and Min_Span method 1120 may only choose balanced physical nodes among candidate nodes with the lowest network resources. FIGS. 8, 9 and 10 illustrate that balancing of computing resource load may be achieved if the constraints on network resources are minimized or removed.

Figure 11:
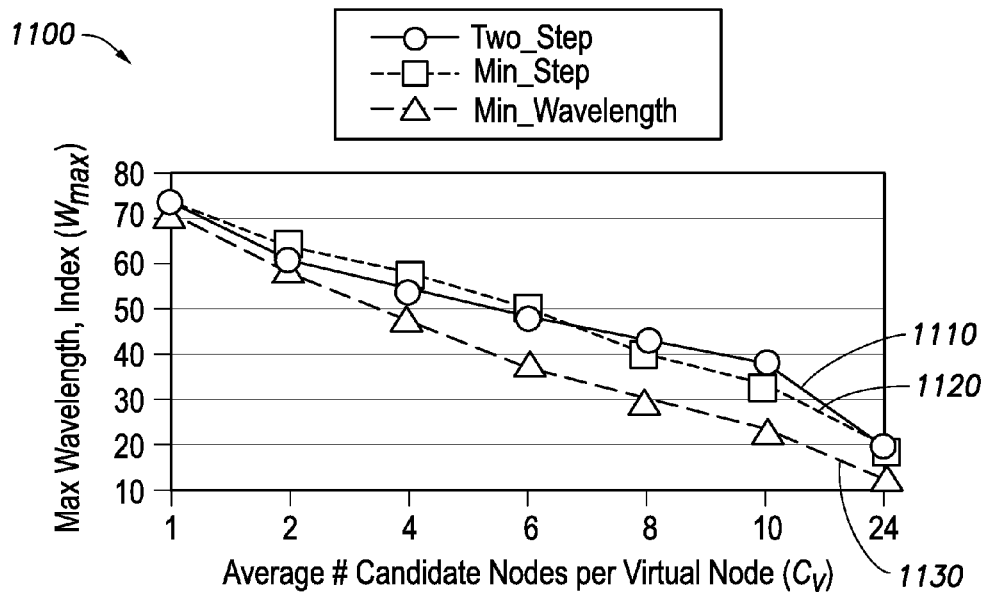
FIG. 11 illustrates a graph of simulation results of wavelength index, $W_{max}$, as a function of average candidate nodes, $c_v$, per virtual node, in accordance with one embodiment of the present disclosure.

FIG. 11 illustrates a graph of wavelength index $W_{max}$ as a function of number of average number of candidate nodes per virtual node, in accordance with one embodiment of the present disclosure. and average wavelength spans per virtual link. Graph 1100 may include plots for Two_Step method 1110, Min_Span method 1120, and Min_Wavelength method 1130. FIG. 11 may be described as illustrating $W_{max}$ per virtual link. For example, for fixed node mapping ($c_v$=1), $W_{max}$ may be approximately seventy-two. When a virtual node has an increased allocation flexibility ($c_v$=24), $W_{max}$ may be approximately twelve for Min_Wavelength method 1130, or approximately eighty-three percent lower than fixed node mapping ($c_v$=1).

Figure 12:
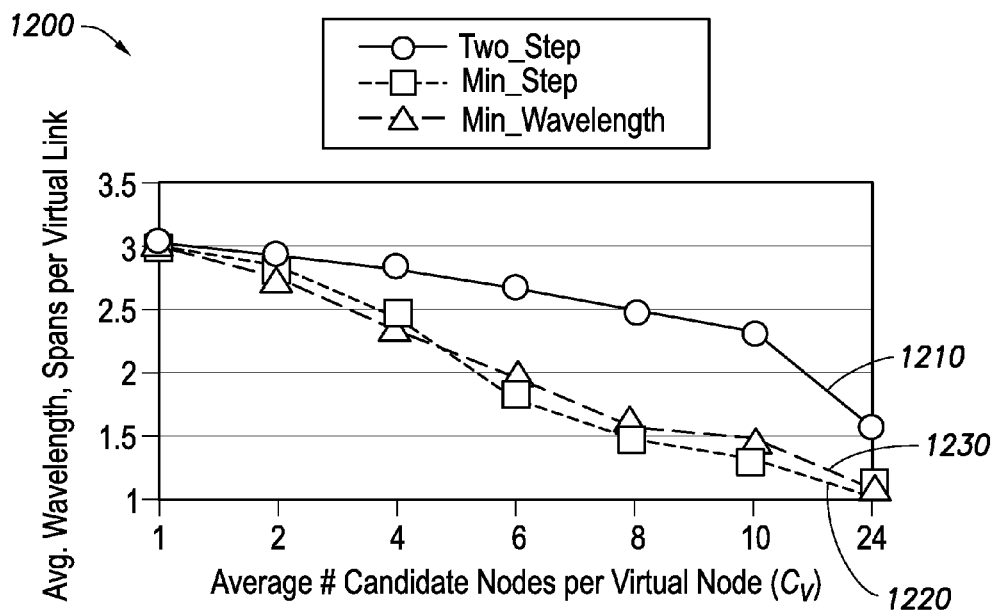
FIG. 12 illustrates a graph of simulation results of average wavelength spans per virtual lengths as a function of average candidate nodes, $c_v$, per virtual node, in accordance with one embodiment of the present disclosure.

FIG. 12 illustrates a graph of average wavelength spans per virtual lengths as a function of average number of candidate nodes per virtual node, in accordance with one embodiment of the present disclosure. Graph 1200 may include plots for Two_Step method 1210, Min_Span method 1220, and Min_Wavelength method 1230. FIG. 12 may be described as illustrating average wavelength spans per virtual link. For example, for fixed node mapping ($c_v$=1), the average wavelength spans per virtual link may be approximately three. When a virtual node has an increased allocation flexibility ($c_v$=24), the average wavelength spans per virtual link may be approximately 1.14 for Min_Wavelength method 1230, or sixty-two percent lower than fixed node mapping ($c_v$=1).

Figure 13:
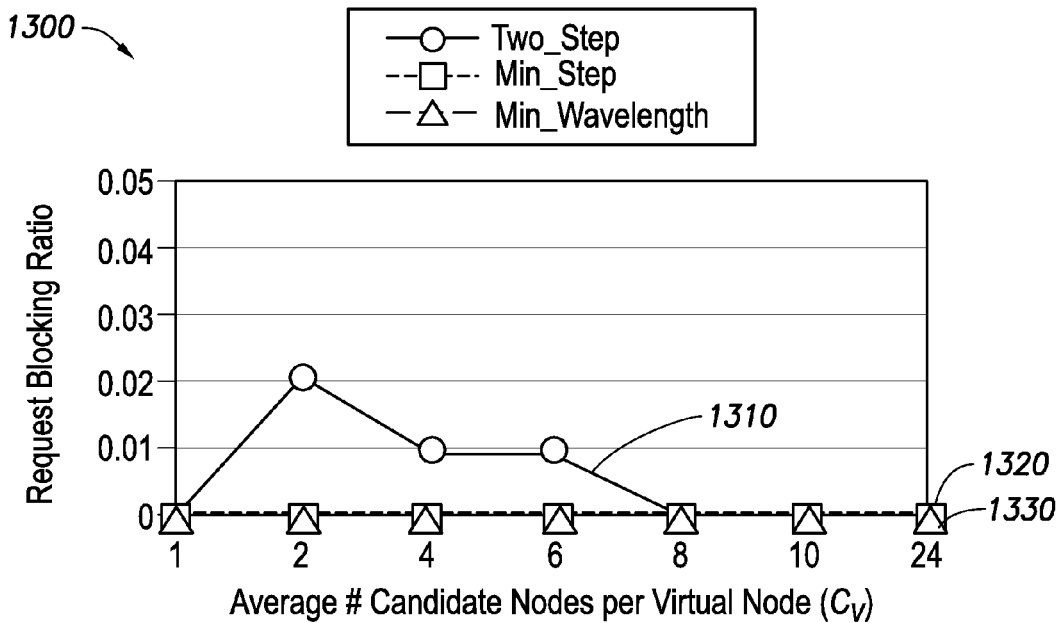
FIG. 13 illustrates a graph of simulation results of a blocked VN request ratio as a function of average candidate nodes, $c_v$, per virtual node, in accordance with one embodiment of the present disclosure.

FIG. 13 illustrates graph 1300 of simulation results of a ratio of VN requests that are blocked as a function of average number of candidate nodes per virtual node, in accordance with one embodiment of the present disclosure. Graph 1300 may include plots for Two_Step method 1310, Min_Span method 1320, and Min_Wavelength method 1330. Graph 1300 illustrates that VN requests in Two_Step method 1310 may be blocked when $c_v$ is between approximately two and eight. This blocking may occur even when there are enough network and computation resources. VN requests may be blocked when utilizing Two_Step method 1310 because two virtual nodes may not be mapped to the same physical node in this method, and there is no back tracking to re-map to a different candidate node $c_v$.

Figure 14:
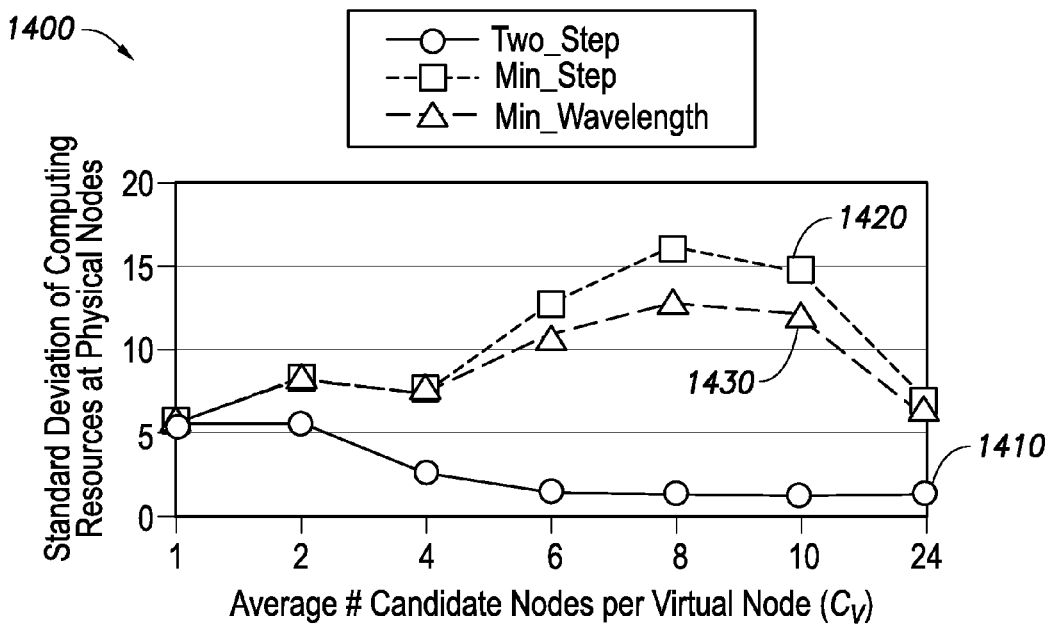
FIG. 14 illustrates graph of simulation results of standard deviation of computing resources at physical nodes as a function of average candidate nodes, $c_v$, per virtual node, in accordance with one embodiment of the present disclosure.

FIG. 14 illustrates graph 1400 of simulation results of standard deviation of computing resources at physical nodes as a function of average number of candidate nodes per virtual node, in accordance with one embodiment of the present disclosure. Graph 1400 may include plots for Two_Step method 1410, Min_Span method 1420, and Min_Wavelength method 1430. Graph 1400 illustrates that as $c_v$ increases from two to eight, the standard deviation of computing resource load may increase in both Min_Span method 1420 and Min_Wavelength method 1430. The increase may be because the choices of candidate nodes $c_v$ may be limited and virtual node mappings with shorter wavelength spans may be chosen. As $c_v$ increases from eight to twenty-four, the standard deviation may decrease because increasingly balanced physical nodes may be chosen among an increased number of candidate nodes. FIGS. 11-14 illustrate the impact on network resources as the virtual node mapping flexibility ($c_v$) increases.

The example simulation results illustrate that utilization of Min_Span method 600 shown in FIG. 6 and Min_Wavelength method 700 shown in FIG. 7, may result in up to approximately thirty percent savings in optical network 100 resources compared to an existing Two_Step method that independently performs virtual network mapping and RWA. Also, a network design with flexible virtual node mapping may efficiently utilize optical network resources compared to fixed node mapping, taking advantage of network virtualization.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could me made hereto without departing from the spirit and scope of the invention.

What is claimed is:

1. A method for routing and wavelength assignment for optical network resources required for a plurality of virtual network requests, comprising:
   receiving the plurality of virtual network requests;
   determining a number of virtual links for each virtual network request;
   sorting the plurality of virtual network requests based on the number of virtual links;
   selecting a virtual network request from the plurality of virtual network requests and setting a number of allowable spans;
   determining whether a valid virtual node mapping exists for the virtual network request on any of a plurality of wavelengths based on the allowable spans;
   based on determining that no valid virtual node mapping exists on any of the plurality of wavelengths, incrementing the number of allowable spans.

2. The method of claim 1, wherein the number of the plurality of wavelengths is limited by a predetermined maximum number of wavelengths.

3. The method of claim 1, wherein the number of allowable spans is limited by a predetermined maximum number of spans.

4. The method of claim 1, further comprising determining whether a valid virtual node mapping exists for the virtual network request on any of the plurality of wavelengths based on the incremented number of allowable spans.

5. The method of claim 1, wherein determining whether a valid virtual node mapping exists comprises:
sorting a plurality of virtual nodes associated with the virtual network request based on a virtual nodal degree; and
determining candidate nodes for each of the plurality of sorted virtual nodes.

6. The method of claim 5, further comprising determining if there is a lightpath available for each of a plurality of virtual links that communicatively couple the plurality of virtual nodes.

7. The method of claim 1, further comprising mapping each of a plurality of virtual nodes associated with the virtual network request to physical nodes.

8. An optical network, comprising:
a plurality of physical nodes;
a plurality of physical links that communicatively couple the plurality of physical nodes;
a resource manager communicatively coupled to the plurality of physical nodes, the resource manager configured to:
receive a plurality of virtual network requests;
determine a number of virtual links for each virtual network request;
sort the plurality of virtual network requests based on the number of virtual links;
select a virtual network request from the plurality of virtual network requests and set a number of allowable spans;
determine whether a valid virtual node mapping exists for the virtual network request on any of a plurality of wavelengths based on the allowable spans;
based on determining that no valid virtual node mapping exists on any of the plurality of wavelengths, increment the number of allowable spans.

9. The optical network of claim 8, wherein the number of the plurality of wavelengths is limited by a predetermined maximum number of wavelengths.

10. The optical network of claim 8, wherein the number of allowable spans is limited by a predetermined maximum number of spans.

11. The optical network of claim 8, wherein the resource manager is further configured to determine whether a valid virtual node mapping exists for the virtual network request on any of the plurality of wavelengths based on the incremented number of allowable spans.

12. The optical network of claim 8, wherein determining whether a valid virtual node mapping exists comprises:
sorting a plurality of virtual nodes associated with the virtual network request based on virtual nodal degree; and
determining candidate nodes for each of the plurality of virtual nodes.

13. The optical network of claim 12, further comprising determining if there is a lightpath available for each of a plurality of virtual links that communicatively couple the plurality of virtual nodes.

14. The optical network of claim 8, wherein the resource manager is further configured to map each of a plurality of virtual nodes associated with the virtual network request to physical nodes.

15. A non-transitory computer-readable storage medium comprising logic for virtual network requests, the logic when executed by a processor operable to:
receive a plurality of virtual network requests;
determine a number of virtual links for each virtual network request;
sort the plurality of virtual network requests based on the number of virtual links;
select a virtual network request from the plurality of virtual network requests and set a number of allowable spans;
determine whether a valid virtual node mapping exists for the virtual network request on any of a plurality of wavelengths based on the allowable spans;
based on determining that no valid virtual node mapping exists on any of the plurality of wavelengths, increment the number of allowable spans.

16. The non-transitory computer-readable storage medium of claim 15, wherein the number of the plurality of wavelengths is limited by a predetermined maximum number of wavelengths.

17. The non-transitory computer-readable storage medium of claim 15, wherein the number of allowable spans is limited by a predetermined maximum number of spans.

18. The non-transitory computer-readable storage medium of claim 15, wherein the logic is further operable to determine whether a valid virtual node mapping exists for the virtual network request on any of the plurality of wavelengths based on the incremented number of allowable spans.

19. The non-transitory computer-readable storage medium of claim 15, wherein determining whether a valid virtual node mapping exists comprises:
sorting a plurality of virtual nodes associated with the virtual network request based on virtual nodal degree; and
determining candidate nodes for each of the plurality of virtual nodes.

20. The non-transitory computer-readable storage medium of claim 19, further comprising determining if there is a lightpath available for each of a plurality of virtual links that communicatively couple the plurality of virtual nodes.

* * * * *